INVENTORS:
William L. Bulkley
Sixt Frederick Kapff

BY

ATTORNEY

April 23, 1963

W. L. BULKLEY ET AL 3,086,993

LIQUID PHASE OXIDATION PROCESS

Filed Dec. 31, 1958

INVENTORS:
William L. Bulkley
Sixt Frederick Kapff

BY

ATTORNEY

INVENTORS:
William L. Bulkley
Sixt Frederick Kapff

BY

ATTORNEY

United States Patent Office 3,086,993
Patented Apr. 23, 1963

3,086,993
LIQUID PHASE OXIDATION PROCESS
William L. Bulkley, Munster, Ind., and Sixt Frederick Kapff, Homewood, Ill., assignors to Standard Oil Company, Chicago, Ill., a corporation of Indiana
Filed Dec. 31, 1958, Ser. No. 784,335
12 Claims. (Cl. 260—524)

This invention relates to the liquid phase oxidation of organic compounds with molecular oxygen, and more particularly is concerned with preventing the formation of explosive gas or vapor mixtures during the oxidation of organic compounds with an oxygen-containing gas while the compounds are dissolved in a lower monocarboxylic acid solvent.

Many processes have been suggested or employed whereby certain functional groups on organic compounds are catalytically oxidized to carbonyl or carboxyl groups by reaction with molecular or gaseous oxygen. The more advanced of these processes are conducted in the liquid phase and employ a lower monocarboxylic acid (i.e. a paraffinic, naphthenic or aromatic acid containing from 2 to 7 carbon atoms in the molecule) as an inert solvent for the feedstock, and use one or more of the heavy metals as catalyst. Generally, liquid phase oxidations are conducted in a batchwise manner by passing an oxygen-containing gas—conveniently air—into a reaction zone containing a batch or body of the liquid reaction mixture of feedstock, solvent, and catalyst for a time sufficient to effect the desired conversion, thereafter terminating gas flow, unloading and re-charging the reaction zone with reaction mixture, and repeating the cycle.

In an efficient oxidation process, throughout a substantial portion of an oxidation cycle, oxygen in the oxidizing gas stream is substantially completely consumed in the reaction. Consequently, the effluent gas during this period contains less than a percent or two of oxygen, and is composed of inert non-condensible components of the oxidizing gas (e.g. nitrogen), some water and carbon dioxide, from about 10 to about 70% of monocarboxylic acid solvent vapors, and small amounts of feedstock and product vapors. Vapors of both the monocarboxylic acid and the feedstock and product are of course highly flammable. However, when oxygen is being substantially completely consumed, the effluent gas is too lean in oxygen to explode, since a minimum of about 8% oxygen is necessary to support combustion. But at two periods of the process, oxygen utilization may be incomplete and, as a result, the effluent gas may be in a composition range which can explode if the gas is ignited; in other words, the effluent gas forms an "explosive mixture." These two periods are at the initiation of an oxidation and for a period at the end of a reaction when the concentration of oxidizable feedstock in the liquid reaction mixture is low.

In liquid phase oxidations employing molecular oxygen the danger of igniting explosive gas mixtures is always present. By a phenomenon termed "fall potential" (because it was first observed above waterfalls), whenever fine droplets are separated from a large mass of a liquid an electrostatic potential is generated between the droplets and the remaining liquid. When oxidizing gas passes through a reaction mixture, liquid entrainment is unavoidable. While an electrostatic potential of only 300 volts can produce sparks of sufficient intensity to ignite and detonate an explosive gas mixture, it is known that air agitation of organic compounds may generate fall potentials in excess of 1000 volts (Klaerner, Ind. Eng. Chem., vol 39, No. 1, p. 92, 1947). It is therefore a primary object of the present invention to provide an improved method for safely conducting the liquid phase oxidation of organic compounds, which method relies on automatic means for preventing the formation of explosive effluent gas mixtures.

In accordance with the present invention, cyclic processes for the liquid phase oxidation of organic compounds with an oxidizing gas containing molecular oxygen and an inert component which are conducted by passing said oxidizing gas into a reaction zone containing a liquid body of the organic compound dissolved in a lower monocarboxylic acid, are rendered completely safe by continuously monitoring the oxygen content of the effluent gas, obtaining oxygen-lean effluent gas during portions of an oxidation cycle when oxygen is being substantially completely consumed, and admitting said oxygen-lean effluent gas to the reaction zone in response to the monitored oxygen content when oxygen utilization is incomplete, in an amount effective to dilute the oxygen concentration of the effluent gas below the explosive limit. In one aspect, the invention is applied to an oxidation system comprising a single reaction zone, and oxygen-lean effluent gas is collected and stored during complete oxygen consumption periods; the storage may be at a pressure which is higher or lower than that obtaining in the oxidation system. In another aspect, the invention is applied to a system comprising a plurality of oxidation zones, and the operation of each zone is phased so that while one zone is in a period of low oxygen consumption, evolving an oxygen-rich gas and requiring the introduction of oxygen-lean effluent gas, another zone is then evolving such lean gas. By the method of the invention, disadvantages of prior art ignition-prevention techniques are overcome entirely and liquid phase oxidation processes employing molecular oxygen as the oxidizing agent may be conducted in a completely safe and efficient manner.

The invention will be more fully understood by reference to the attached figures in which.

It has been determined that with acetic acid as the lower monocarboxylic acid solvent, an oxygen concentration below about 8% on a vapor-free basis is completely effective in preventing explosions at system pressures below about 400 p.s.i.g. and at temperatures between about 350 and 400° F., which are the most usual conditions for conducting an oxidation. The 8% figure holds true for this temperature and pressure range with acetic acid vapors in admixture with vapors of most organic compounds whether or not any water vapor is present. Water is normally present in oxidation reaction mixtures as a product of the oxidation of hydrogen in the organic feedstock. For temperatures or pressures outside of the foregoing range, for monocarboxylic acids other than acetic, or for nonhydrocarbon feeds, the determination and composition of explosive limits may be performed readily by following the methods given in Bureau of Mines Bulletin 503 entitled, "Limits of Flammability of Gases and Vapors," U.S. Government Printing Office, 1952, particularly at pages 5, 6, 8, 9, and 10.

Figures 4, 5:
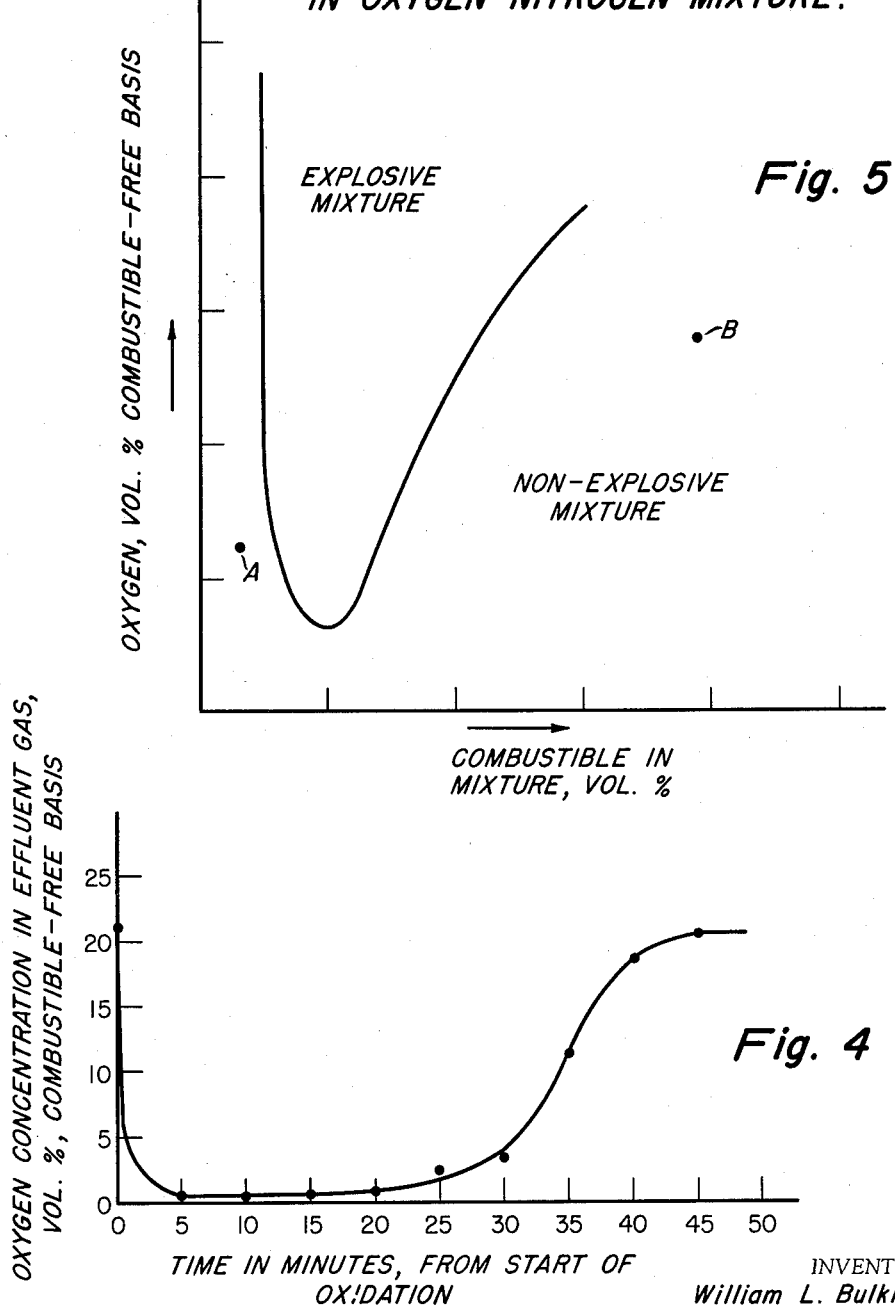
FIGURE 4 shows the oxygen concentration in the effluent gas during one extended cycle of a typical air oxidation process for the conversion of xylenes to phthalic acids which is conducted in the presence of a bromine-promoted heavy metal oxidation catalyst.
FIGURE 5 shows typical flammable limits of a combustible vapor in oxygen-nitrogen mixtures derived from air, with concentrations being expressed on a combustible-free basis.

As may be seen by examination of FIGURE 5, a combustible vapor (e.g. acetic acid) in a gas mixture comprising oxygen and nitrogen will form an explosive mixture only within certain well defined composition ranges. The boundaries of these ranges are referred to as "explosive limits," and for any given system the limits vary somewhat with system pressure and temperature. At a fixed pressure and temperature, a gas mixture having a concentration of combustible less than that corresponding to the left branch of the curve will not explode irrespective of the amount of oxygen present since there is insufficient combustible present as, for example, point "A" in FIGURE 5. At combustibles concentrations to the right of the explosive region, typified by point "B," the mixture is too rich in combustibles to explode. Note, however, that if the non-explosive mixture of B is treated (as by cooling and condensation) to remove some of the combustible, the mixture may then move into an explosive composition range. But when the oxygen concentration is below the lowest point on the curve, there is no concentration of combustible which can produce an explosive mixture. It is the low-oxygen composition limit that provides complete assurance against explosions irrespective of how the combustibles concentration is changed. Examination of FIGURE 5 indicates that, of the three possible methods for changing the composition of an explosive mixture to render it non-explosive, i.e. (1) remove some of the combustible, (2) add more combustible, or (3) add an inert component to dilute the oxygen, the last method is the safest most positive approach and it is this procedure which is followed in the invention described herein.

Numerous feedstocks may be catalytically oxidized with molecular oxygen in the liquid phase to yield commercially valuable products. Generally speaking, where an organic feedstock has a stable cyclic configuration with one or more aliphatic side chains containing up to about four carbon atoms each, the side chain is oxidized to a nuclearly-attached carboxylic acid group. For example, polyalkyl benzenes such as xylenes are converted to benzene polycarboxylic acids. Several commercial oxidation processes are outlined in Chemical Week, April 6, 1957, pp. 32-42, and references cited therein. Processes which are ideally suited for incorporation of the instant invention by reason of their exceptionally efficient oxygen utilization are described in Belgian Patents 546,191 and 550,529, and utilize bromine and a heavy metal oxidation catalyst in conjoint presence to catalyze the oxidation.

Commonly used oxidation catalysts are metals or compounds of metals which are desirably selected from the heavy metal group as defined in the Periodic Chart of Elements" on pages 56 and 57 of the Handbook of Chemistry," 8th edition, Handbook Publishers Inc., Sandusky, Ohio, 1952. These oxidation catalysts are quite well known to those skilled in the art, and are exemplified by cobalt, manganese, iron, nickel, lead, tin, molybdenum, tungsten, cerium, and neodymium. Bromine or a substance capable of affording bromine is very advantageously employed in the oxidation as a promoter or co-catalyst for the metal oxidation catalyst. Other catalyst systems may be employed, but for the present invention to be adaptable, it is desirable that the catalyst system be sufficiently active to cause the consumption of about 90% or more of the oxygen in the oxidizing gas during a substantial portion of the reaction period, say for at least about 25% of the time, in order that sufficient oxygen-lean gas can be obtained to dilute the reactor effluent gas during the low oxygen consumption periods.

Referring now to FIGURE 4, it is shown that the problem caused by attaining an explosive gas composition in liquid phase oxidation processes employing an oxygen-containing gas can arise at two stages of the process. The run represented by FIGURE 4 is the air oxidation of mixed petroleum xylenes composed of approximately 19% orthoxylene, 40% metaxylene, 11% paraxylene, 28% ethylbenzene and 2% toluene in the presence of acetic acid as a solvent and a cobalt acetate, manganese acetate, tetrabromoethane catalyst. This particular oxidation run is deliberately extended so as to observe the oxygen concentration of the outlet gas at the very end of the run. Operations are commenced by placing the appropriate quantities of xylenes, glacial acetic acid, and catalyst in the reactor and adding nitrogen gas to attain the desired operating pressure. Electric heating elements surrounding the reactor are then energized, and heating is continued until the reaction mixture reaches a temperature sufficient to permit an autothermic oxidation. Air is then admitted through a sparger in the bottom of the reactor. During the first minute or so the effluent gas oxygen content is very nearly that of the inlet gas stream, 21% in the case of air. This initial apparently-poor oxygen utilization may be due to an induction period or may be merely oxygen remaining in the system until a sufficiently high reaction temperature is attained to start the reaction. For this oxidation, the oxygen breakthrough at the latter stages of the reaction is rather rapid; during the first 20 minutes or so after the start of the run, about 1% oxygen is present in the effluent gas, but it gradually rises to 4% in an additional 10 minutes and rapidly shoots up to 19% at the end of 10 minutes more. These concentrations are expressed on an acetic-acid-free basis and would be lower were acetic acid to be considered in the analysis. During an oxidation, anywhere from 20 to as much as 70 volume percent of the effluent gas may comprise acetic acid vapors, depending upon the heat of reaction and the vigor of the oxidation.

FIGURE 4 also shows that towards the end of this run approximately 10 minutes are required from the time the oxygen concentration in the effluent gas reaches about 8% until the oxygen content of the effluent gas reaches 21%. During all of this period the effluent gas is in an explosive composition range, or at least would be in an explosive composition range upon condensing part of the acetic acid, and could explode if a sufficiently high electrostatic potential had developed. It is at this time, together with the initial period at the outset of oxidation, that employment of the present invention is all but essential for safe operation.

While the curve of FIGURE 4 represents a particular example showing one specific oxygen-content v. time curve, several variables affect the results observed in different oxidations and alter the shapes of the curves therein. The nature and concentration of the heavy metal catalyst and of any catalyst promoter are important in this respect, as they largely determine the efficiency of oxygen utilization both at the start, during the course, and toward the end of a run. Also, the feedstock oxidized has an effect in determining the stoichiometric requirements of oxygen and presumably in the relative difficulty of oxidizing one or more of the functional groups. Furthermore, the concentration of feedstock in the solvent, oxidizing gas input rate, reaction temperature, reaction pressure, and possibly also the reactor geometry can alter the shape of the curve. Hence the curve of FIGURE 4 is to be considered merely illustrative of one specific oxidation.

However, by using the present invention, oxidations of substantially any oxidizable feedstocks, conducted within wide ranges of feedstock concentration, catalyst concentration, temperature, pressure, etc., may be performed safely notwithstanding the shape of the oxygen-content v. time curve, since inert gas admission is entirely automatic.

A detailed description of the construction of the present system will now be explained.

Figure 1:
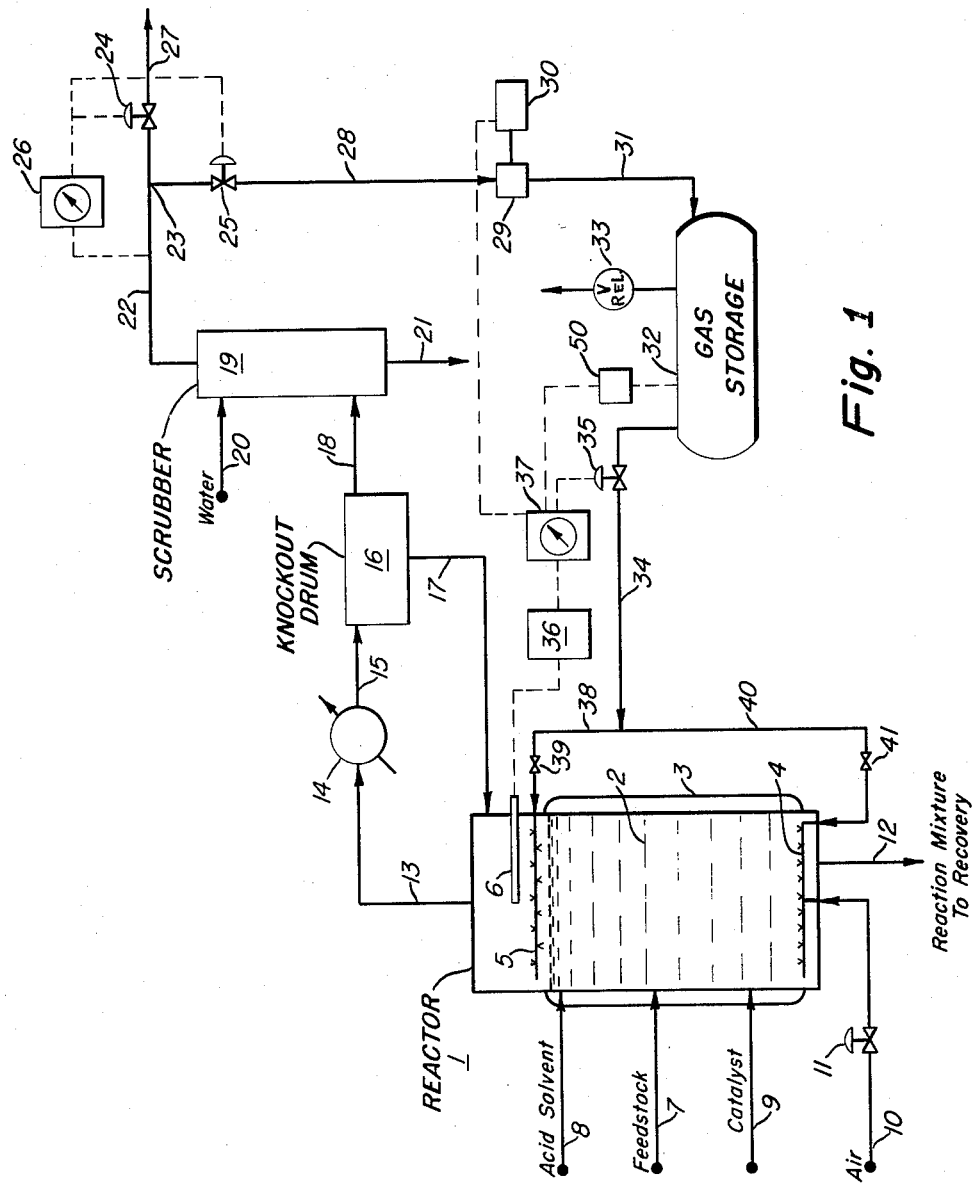
FIGURE 1 is a flowsheet of a liquid phase air oxidation process employing one reactor and high pressure effluent gas storage.

FIGURE 1 is a schematic flow diagram showing a batch-operated liquid phase air oxidation process in which the oxygen-lean effluent gas is stored at high pressure and is admitted to the oxidation system by releasing means automatically responsive to the oxygen concentration of the effluent gas at any given time. Basic equipment for the oxidation includes reactor 1, effluent gas cooler 14, acetic acid knock-out drum 16, water scrubber 19, compressor 29, high pressure gas storage vessel 32, and appropriate control apparatus.

The feed to reactor 1 comprises the oxidizable organic feedstock admitted through line 7, acetic acid from line 8, and the metal-bromine catalyst from line 9. Acetic acid may be used in a volume ratio of from about 0.1:1 to 10:1 on feed, and preferably between about 0.5:1 and 5:1 The catalyst is present in an amount of between 0.05 and 10.0 percent by weight each of metal and bromine based on feedstock. The system is pressured to the desired reactor pressure and heated by means of heating jacket 3 to the desired reaction temperature of between 150–525° F., say 350° F. An oxidizing gas containing molecular oxygen and an inert component is then passed into reaction mixture 2 in reactor 1; this oxidizing gas is conveniently atmospheric air or air containing a diluting proportion of an inert gas such as nitrogen or flue gas. It enters reactor 1 via line 10 and flow control valve 11 and is distributed evenly in the form of a myriad of bubbles by means of a grid sparger or distributor network 4. Reactor 1 may optionally be provided with mechanical agitation means such as a rotary mixer and/or distribution baffles or grids for improving contact between the liquid reaction mixture and the oxidizing gas. The gas rises through liquid reaction mixture 2 while its oxygen is substantially completely consumed (i.e., less than about 2% oxygen remains in the effluent gas) by reaction with feedstock, evolving heat of reaction and producing the desired oxidation product together with byproducts such as water and a small amount of colored tars. Acetic acid and water of oxidation are in part vaporized and mix with the ascending oxidizing gas stream. The effluent gas leaving reaction mixture 2 passes through line 13 to cooler 14 where a substantial portion of the acetic acid and water vapors are condensed and pass with the uncondensed gas through line 15 to knock-out drum 16. In knock-out drum 16 liquid acetic acid and water separate from the inert gas and uncondensed vapors are returned by gravity to reactor 1 through line 17, with optional intermediate fractional distillation (not shown) to discard the water. The effluent gas, which is primarily nitrogen and may contain up to 1 or 2% oxygen with a trace of acetic acid and water, passes through line 18 to water scrubber 19. Water admitted to the top of scrubber 19 through line 20 absorbs acetic acid, and the fat liquor is transmitted from the bottom of scrubber 19 through line 21 to acetic acid-water recovery.

The scrubbed gas leaves scrubber 19 through line 22 where it passes to a pressure and flow control system comprising pressure controller 26, junction 23 and control valves 24 and 25. Junction 23 permits scrubbed gas from line 22 either to leave the system through line 27 and pressure control valve 24, or to be sent to gas storage drum 32 through line 28 and valve 25, or to be sent simultaneously through both systems. Pressure control valves 24 and 25 are both actuated by pressure controller 26 which may be a conventional pressure controller and regulate the back pressure in reactor 1.

According to the preferred embodiment of the system of FIGURE 1, oxygen-lean effluent gas is collected by entirely automatic means. This embodiment includes pressure-responsive switch 50 which closes an electrical switch when the pressure in gas storage drum 32 drops below the desired storage pressure. Switch 32, however, is placed in series with a second switch in controller 37 (or, alternately, analyzer 36) which closes only when less than one or two percent oxygen is present in the effluent gas. The circuit comprising the two switches is connected so as to operate electric motor 30 which drives compressor 29. Thus, compressor 29 pumps oxygen-lean effluent gas to storage drum 32 only when (a) switch 50 indicates that the pressure in drum 32 is low, and (b) when controller 37 indicates that the effluent gas is oxygen-lean. Motor 30 is shut off when the pressure in drum 32, as indicated by switch 50, is at a satisfactory level.

Gas storage drum 32 is constructed of metal and is designed to contain a gas pressure in excess of that employed for the oxidation process in reactor 1. This pressure is desirably at least 100 pounds and preferably more than 500 pounds above the pressure of reactor 1 so as to minimize the required size of storage drum 32. Relief valve 33 is provided on drum 32 to permit the release of any excessive pressure therefrom. The required size of drum 32 depends on the pressure differential between it and reactor 1, the amount of gas that is to be stored, and the oxygen concentration of the effluent gas when oxygen is being substantially completely consumed.

When needed to dilute the effluent gas, inert gas stored in drum 32 is conducted through line 34 and flow control valve 35, and thereafter through either line 38 and valve 39 or line 40 and valve 41 to reactor 1. Line 40 and valve 41 and line 38 and valve 39 are alternative systems and either or both may be provided. Gas returned to the reactor 1 through line 38 and valve 39 is distributed evenly by a network of pipes 5 at a level near the top of the reaction mixture 2 in reactor 1. By this arrangement it is possible to secure the benefits of a high oxygen partial pressure in the oxidizing gas bubbling upward through reactor mixture 2 and thus obtain rapid oxidation rates, while the effluent gas leaving reaction mixture 2 is adequately diluted by inert gas from network 5 so that the oxygen concentration of the effluent gas leaving the reaction mixture is never within explosive composition limits. Continuous monitoring of the effluent gas oxygen content is provided by automatic oxygen analyzer 36, which may be a Pauling paramagnetic instrument (described by Pauling et al. in Jour. Amer. Chem. Soc., 68, pp. 795–8, 1946, and in U.S. Patent 2,416,344). Analyzer 36 is continuously supplied with a sample of reactor effluent gas obtained by probe 6 which is shown as being inserted into the liquid-vapor disengaging space at the top of reactor 1. This location, particularly when the sample of effluent gas is cooled to condense acetic acid and water vapors prior to analysis, is most advantageous as it permits almost instantaneous detection of any change in the oxygen content of the effluent gas. Probe 6 may be located downstream of coolers 14 to sample the gas leaving reaction mixture 2 after condensation and removal of acetic acid and water, e.g. in knock-out drum 16. The insertion of probe 6 downstream of cooler 14, while it may introduce some delay in measuring oxygen concentration, may be desirable in system wherein the effluent gas contains a substantial portion of solvent vapors and, although the gas leaving reactor 1 may be too rich in flammable vapors to be explosive, the gas in knock-out drum 16 after condensation of the acid by cooler 14 may be of a composition which is explosive. For ultimate safety, probes are inserted both into the top of reactor 1 and into the gas stream after cooler 14, each leading to separate oxygen analyzers. Each analyzer can then cause the admission of stored oxygen-lean gas to reactor 1 when an explosive gas is present anywhere in the system.

The output of oxygen analyzer 36 is in terms of an electrical current having a voltage or amperage proportional to the oxygen concentration of the gas being sampled. This output is delivered to controller 37 which may be a Brown Electronik indicating recorder controller (described in Catalog C15–12 of the Minneapolis-Honeywell Regulator Co., Industrial Division, Philadelphia, Pa.) which, besides showing the instantaneous oxygen concentration also records the oxygen concentration and delivers a controlling air pressure to flow control valve 35 which is related to the instantaneous oxygen concentration. In a typical installation, controller 37 has a range of from 0% to 10% oxygen and is set with a 40% proportional band width. Thus, when the oxygen control is set for 4%, when the oxygen content is between 0 and 2% valve 35 is completely closed, above 2% it begins to open, at 4% it is half open, and at 6% and above it is full open. If controller 35 has a reset and/or a derivative response action, these will affect the valve position relative to oxygen concentration depending on the controller settings. Alternately, controller 37 is set for a zero proportional band width and delivers an on-off air signal to valve 35 when a predetermined oxygen level, e.g. 4%, is reached, thus providing a discontinuous diluting stream of inert gas for reactor 1. It is however preferred that the amount of inert gas obtained from storage drum 32 vary with the effluent gas oxygen concentration in order to conserve inert gas and supply only sufficient inert gas to maintain the oxygen concentration of the reactor effluent gas below the explosive limit. For this reason it is desirable that controller 37 be equipped with variable proportional band control and preferably also with reset and derivative response controls.

In an oxidation cycle using the system of FIGURE 1, reactor 1 is initially charged with monocarboxylic acid solvent, feedstock, and catalyst. The reactor contents are heated to the desired initial reaction temperature of say 350° F. and simultaneously pressured with inert gas stored in vessel 32 from a previous run. Inert gas is added either through line 38 or through line 40 until the pressure in reactor 1 reaches about 300 to 400 p.s.i. At this pressure and temperature, and with an active catalyst, oxygen reacts almost quantitatively (i.e. at least 90% consumption at any given instant) with the feedstock after a short initial induction period.

With either valve 39 or valve 41, or both, in an open position, air is admitted to reactor 1 through line 10 and flow control valve 11 at a rate which provides a reasonably short reaction time without producing excessive entrainment. Initially, and for a short period after commencement of air flow, the reactor effluent gas may contain some oxygen, and this is diluted with stored inert gas from vessel 32 by the automatic action of valve 35 actuated by oxygen analyzer 36 and controller 37. When the oxygen concentration in the effluent gas decreases to a safe amount, e.g. less than about 2–4% on an acetic-acid-free basis, inert gas flow is automatically and gradually discontinued.

After a few minutes of operation, when the reactor effluent gas is substantially free (less than about 2%) from oxygen, the system is ready to collect and store oxygen-lean or effluent gas. Where, according to the preferred embodiment, this operation is performed automatically, pressure-responsive switch 50 closes when the pressure in drum 32 falls below the desired storage pressure, and the electrical circuit is completed when the switch in oxygen analyzer-controller 37 is closed by an indication of substantially oxygen-free effluent gas, thus starting motor 30 of compressor 29. When sufficient gas has been stored in vessel 32 to provide for safe operation of the oxidation process during the final stages of oxidation, switch 50 opens compressor motor 30 circuit and effluent gases are discharged only through line 27 to exhaust.

After the oxidation in reactor 1 has continued for from about 15 minutes to several hours, depending upon such factors as the air rate, the catalyst activity and concentration, and the nature of the feedstock to be oxidized, oxygen begins appearing in the reactor effluent gas in ever increasing amounts. The effluent gas is being continuously sampled through probe 6 and is analyzed by oxygen analyzer 36, and when the effluent gas shows an oxygen concentration above say 2% or so on a vapor-free basis (but less than the explosive limit of 8%), inert gas is automatically added in an amount sufficient to provide a nonexplosive reactor effluent gas. As mentioned previously it is preferred to admit the inert gas through line 38 and valve 39 and distribute it just at or above the liquid level of reaction mixture 7 in reactor 1.

The oxidation may be terminated when stoichiometric consumption of oxygen by the feedstock has been attained, thus indicating complete conversion of the feed to the product. Air flow through line 10 and valve 11 is then discontinued and the reaction mixture withdrawn from reactor 1 through line 12 to a separate product recovery and purification system.

Figure 2:
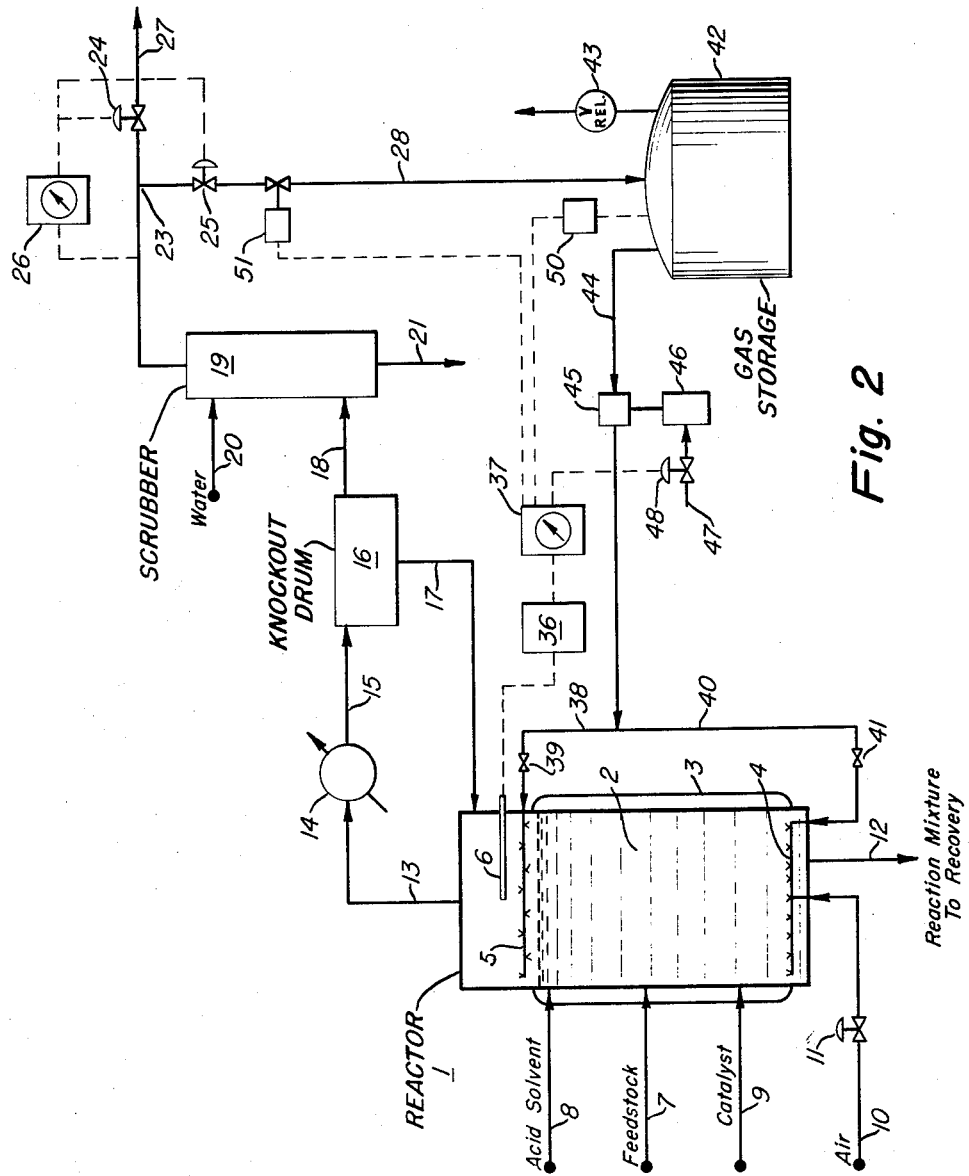
FIGURE 2 is a flowsheet of a liquid phase air oxidation process employing one reactor and low pressure effluent gas storage.

FIGURE 2 represents a process which accomplishes the same result as the system of FIGURE 1 but employs, in lieu of high pressure gas storage and automatic release of the stored inert gas into the reactor, a low pressure gas holder 42 and automatic pumping of the stored inert gas by compressor 45 into reactor 1. The system of FIGURE 2 is advantageously employed when it is desirable from an economic standpoint to substitute low pressure gas storage for high pressure. It is less efficient thermodynamically than the system of FIGURE 1 as compressor 45 must pump the inert gas from substantially atmospheric pressure up to the reaction pressure of about 400 p.s.i.g.

As previously indicated, the apparatus shown in FIGURE 2 is basically similar to that of FIGURE 1. The gas flow in and around the reactor 1, cooler 14, knock-out drum 16, water scrubber 19, and valves 23, 24 and 25 is identical. However, when inert gas is being collected through line 28 and valve 25 it is sent to a gas holder 42 which may be a floating roof or liquid sealed gas holder or a similar vessel which is adapted to store gas at a low pressure, e.g. atmospheric or a few pounds gage pressure. Alternatively, gas holder 42 may be a Hortonsphere which can contain gases at pressures of up to about 100 p.s.i.g. Oxygen-lean effluent gas from gas holder 42 is withdrawn through line 44 by compressor 45, the speed of which is regulated by a control valve 48 on steam input line 47 to its steam-driven motor 46 which in turn is actuated by control air from oxygen analyzer 36 and controller 37. The use of steam to power compressor 45 is highly desirable as it permits simple control over the speed of compressor 45 and hence ready variability of compressor output. Compressor 45 may be a multi-stage piston compressor. Inert gas is pumped through either line 38 and valve 39 or line 40 and valve 41 into reactor 1 when the effluent gas oxygen concentration reaches a level such that dilution by the stored inert gas is necessary in order to preserve a non-explosive atmosphere.

A modification to the system of FIGURE 2 within the scope and spirit of the invention involves elimination of compressor 45 and substitution thereof by a control valve similarly actuated by oxygen analyzer 36 and controller 37 which discharges the collected and stored inert gas into the suction of the main air compressor (not shown) employed to pump oxidizing air through line 10 into reactor 1. This has the advantage of eliminating the need for an inert gas compressor but requires that insert gas be added through distributor network 4 at the bottom of reaction mixture 2, with attendant lowered effectiveness of the oxidizing gas since its oxygen partial pressure is lower.

The sequential operation of the apparatus in FIGURE 2 is similar to that of FIGURE 1 except that instead of opening valve 35 when the oxygen concentration in the effluent gas is high, oxygen analyzer 36 and controller 37 activate compressor 45. Automatic collection of oxygen-lean effluent gas is accomplished when pressure-responsive switch 50 on gas holder 42 indicates low pressure at the same time when limit switch on oxygen-analyzer controller 37 indicates the generation of oxygen-lean effluent gas. When both switches are closed, solenoid valve 51 opens and permits collection of oxygen-lean gas.

Figure 3:
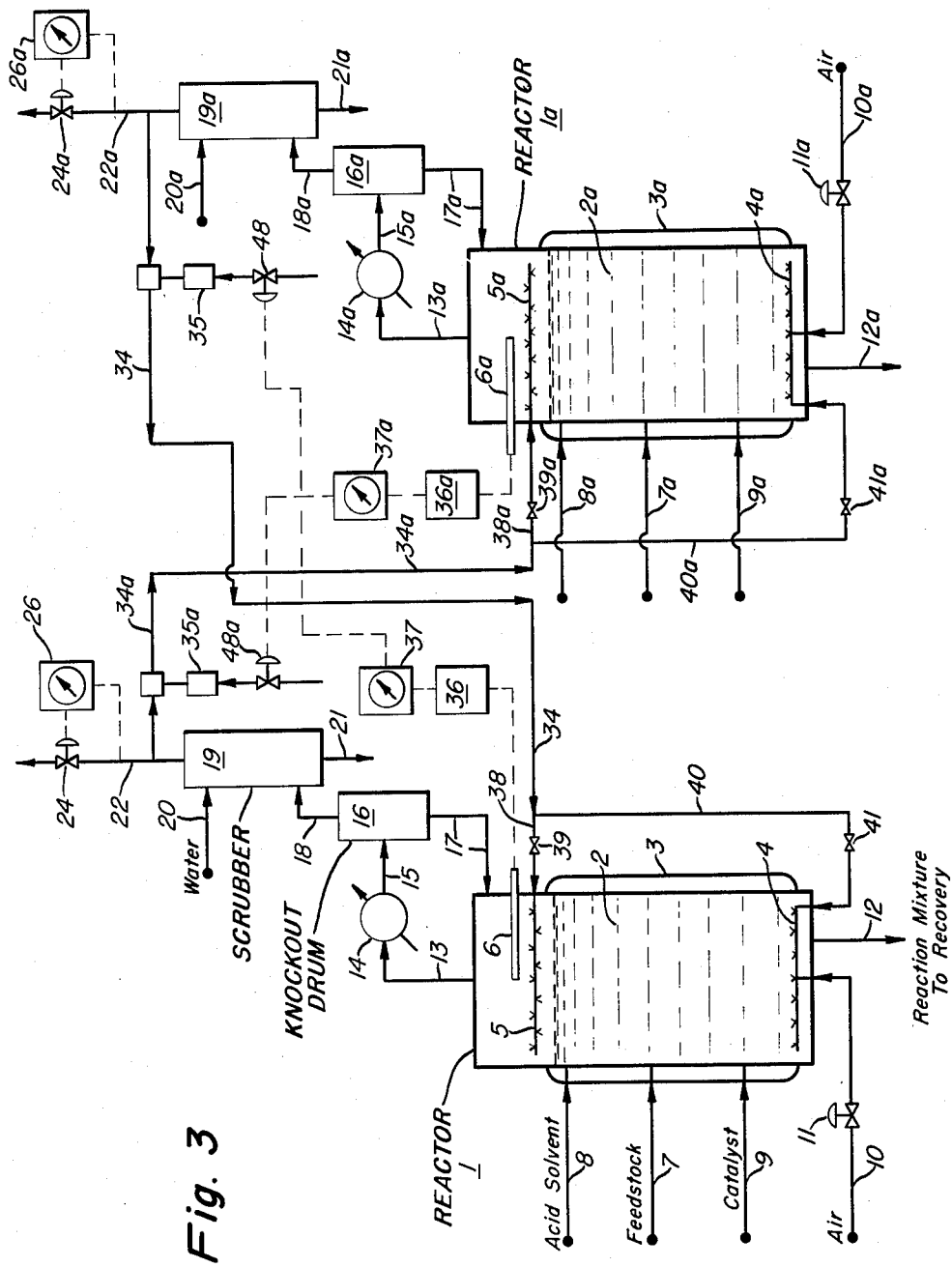
FIGURE 3 is a flowsheet of a liquid phase air oxidation process employing a plurality of reactors.

Turning now to FIGURE 3, the invention is exemplified with reference to an oxidation system comprising two reactors 1 and 1a. In systems employing a plurality of reactors, external inert gas storage vessels are unnecessary since the commencement of each reactor operating cycle is phased so that while one reactor is at a period of its operation wherein oxygen consumption is low and accordingly its effluent gas is oxygen-rich and hence explosive, the other reactor(s) is delivering an essentially oxygen free effluent gas. In the case of a two reactor system, as shown in FIGURE 3 herein, where each reactor operates on a one hour cycle, reactor 1 would commence operation, say, on the hour while reactor 1a would begin at the half hour. Thus, at the outset of a typical one hour period, reactor 1a is evolving a substantially oxygen free effluent gas. Reactor 1 is brought onstream by pressuring to the desired pressure and heating to the requisite autothermic reaction temperature. Air is sparged in through line 10 and distributed at the bottom of reaction mixture 2. Since the gas leaving reaction mixture 2 initially contains free oxygen and is in the explosive range, oxygen analyzer 36 obtains a sample of the discharge gas, and reports this analysis to controller 37. Controller 37 then activates control valve 48 which admits steam to the turbine driver of gas compressor 35. Compressor 35 thereupon pulls suction from vent line 22a off water scrubber 19a, and conducts the oxygen-lean effluent gas from reactor 1a to reactor 1. As the need for oxygen free gas diminishes, control valve 48 is gradually closed off, thereby shutting down compressor 35. One limitation on a multiple reactor system as described herein is that the rate at which oxygen-lean gas may be collected from one reactor cannot exceed the rate at which that reactor is producing such gas. This is for the purpose of permitting a pressure controller such as 24a to regulate the pressure obtaining in reactor 1a.

After several minutes, it is reactor 1a that begins emitting an oxygen-containing effluent gas since its own operation is entering a period during which oxygen consumption is incomplete. However, by this time the effluent gas from reactor 1 is substantially free of oxygen, and thus gas from the latter is available to dilute the oxygen-containing effluent gas from reactor 1a. When oxygen analyzer 36a indicates the presence of oxygen in reactor 1a, controller 37a signals control valve 48a to admit steam to the turbine driver of compressor 35a, thus withdrawing a portion of the oxygen-lean gas from line 22 (reactor 1) and admitting it to reactor 1a. When the oxidation of reaction mixture 2a is completed, air flow via line 10a is discontinued and product line 12a is opened, thereby releasing the liquid reaction mixture to product recovery. An additional feature of the multireactor system herein is that inert gas is available from compressor 35a and line 34a to pressure reaction mixture 2a out of reactor 1a. Thus no product pumps and no manual gas line block valves need be operated during the cycle.

At the half hour, reactor 1a is refilled with the various components of reaction mixture 2a supplied through lines 8a, 7a and 9a, and air is admitted through line 10a. As in the case of reactor 1, the effluent gas is initially oxygen-rich, and accordingly analyzer 36a and controller 37a turn on inert gas compressor 35a to supply oxygen-lean inert gas from reactor 1 to dilute the effluent of reactor 2a. After a few minutes, the oxygen content of effluent gas from reactor 2a is diminished to a safe level, and inert gas addition is discontinued, thus bringing reactor 1a again onstream. When, toward the end of the hour, reactor 1 begins emitting oxygen-containing effluent gas, oxygen-lean gas is available from reactor 1a to thereby provide safe and sure operation of reactor 1a.

In addition to its employment as a safety measure, the present inventive process is in many instances capable of furnishing an advantageous increase in the yield obtainable in various oxidation processes. Some feedstocks, particularly the trialkyl and higher polyalkyl benzenes, are rather more difficult to oxidize than are some of the more simple compounds, and as a result the oxygen consumption during final portions of an oxidation may be quite far from being complete. Consequently, the effluent gas may be in an explosive composition range for a considerable period before stoichiometric oxygen consumption is attained, and unless the present method were employed the reaction would have to be terminated long before completion. This would introduce a major limitation in plant capacity and create serious problems in separating product from the considerable amounts of intermediates. A few cases in point are the oxidations of pseudocumene to trimellitic acid, and of durene to pyromellitic acid; in one trimellitic acid run the effluent gas became explosive when only 80% of the oxygen had been consumed, while a typical durene oxidation produced an explosive gas after about 60% consumption. Without effluent gas dilution, the oxidation would not proceed beyond these points, but with the employment of the present method, a longer oxidation period is permissible and substantially higher product yields may be obtained.

It will be understood that the arrangement of air input to the oxidation reactor on flow control and the release of effluent gas on pressure control is merely one form of instrumenting the process. Alternative monitoring arrangements such as flow control of the effluent gas and pressure control of the inlet air may be employed, and either of the foregoing arrangements may be supplemented or supplanted by automatic time cycle controllers. In these or other control arrangements the invention described herein may be applied with equal utility and success. It is further understood that although batchwise operation of the oxidation reactor is the procedure which requires most careful protection against the formation of explosive mixtures, the method of this invention is equally applicable as a safety measure whenever a liquid phase oxidation is conducted by either continuous or intermittent operations.

Having described the invention, what is claimed is:

1. In a process for the liquid phase oxidation of an organic compound having a stable cyclic configuration and an oxidizable aliphatic side chain with an oxidizing gas containing molecular oxygen and nitrogen, wherein said oxidizing gas is passed into a reaction zone in a reaction vessel containing a liquid body of said organic compound dissolved in lower monocarboxylic acid, and wherein the extent of oxygen utilization changes during the process so that the effluent gas will normally be explosive during a portion of the process, the method of preventing formation of explosive effluent gas compositions which comprises: continuously monitoring the oxygen content of the effluent gas, obtaining oxygen-lean effluent gas during a portion of the process when oxygen is being substantially completely consumed, and admitting said oxygen-lean effluent gas into the reaction vessel in response to said monitored oxygen content when oxygen utilization is incomplete in an amount effective to dilute the oxygen concentration in the effluent gas below the explosive limit.

2. Process of claim 1 including the step of condensing vapors of monocarboxylic acid from the oxygen-lean effluent gas before admitting said gas to the reaction vessel.

3. Process of claim 1 in which the oxygen-lean effluent gas is obtained from said oxidation process in response to the monitored oxygen content of the effluent gas.

4. Process of claim 1 in which the oxygen-lean effluent gas is admitted to the reaction vessel above said liquid body of organic compound and lower monocarboxylic acid.

5. Process of claim 1 in which the oxygen-lean effluent gas is admitted to the reaction vessel with said oxidizing gas.

6. In a process for the liquid phase oxidation of an organic compound with an oxidizing gas containing molecular oxygen and nitrogen, wherein said oxidizing gas is passed into a reaction zone in a reactor vessel containing a liquid body of said organic compound dissolved in lower monocarboxylic acid, the method of preventing formation of explosive effluent gas compositions which comprises: continuously monitoring the oxygen content of the effluent gas, collecting and storing oxygen-lean effluent gas during a portion of an oxidation process when oxygen is being substantially completely consumed, and admitting said oxygen-lean effluent gas into the reaction vessel in response to said monitored oxygen content when oxygen utilization is incomplete in an amount effective to dilute the oxygen concentration in the effluent gas below the explosive limit.

7. Process of claim 6 in which the collected oxygen-lean effluent gas is stored at a pressure substantially in excess of the reaction vessel pressure, and is released into said reaction vessel in response to the concentration of oxygen in the effluent gas leaving said vessel.

8. Process of claim 6 in which the collected oxygen-lean effluent gas is stored at a pressure below the reaction vessel pressure and is pumped into said reaction vessel in response to the concentration of oxygen in the effluent gas leaving said vessel.

9. Process of claim 6 in which the stored oxygen-lean effluent gas is returned to said reaction vessel above said liquid body of organic compound and lower monocarboxylic acid.

10. Process of claim 6 in which the oxygen-lean effluent gas is admitted to the reaction vessel with said oxidizing gas.

11. In a process for the liquid phase oxidation of an organic compound having a stable cyclic configuration and an oxidizable aliphatic side chain with an oxidizing gas containing molecular oxygen and nitrogen, wherein said oxidizing gas is passed into at least two reaction vessels, each containing a liquid body of said organic compound dissolved in lower monocarboxylic acid, and wherein the extent of oxygen utilization changes during the process, the method of preventing formation of explosive effluent gas compositions which comprises: phasing the operating cycle of each of said reaction vessels so that while one of said vessels is evolving an oxygen-rich gas another of said vessels evolving an oxygen-lean effluent gas, continuously monitoring the oxygen content of the effluent gas from each of said reaction vessels, obtaining oxygen-lean effluent gas from a vessel then evolving such gas, and admitting said oxygen-lean effluent gas so obtained into a reaction vessel then evolving oxygen-rich effluent gas in response to the monitored oxygen content of said latter vessel when oxygen utilization is incomplete, in an amount effective to dilute the oxygen concentration in the effluent gas from said latter vessel below the explosive limit.

12. In a process for the liquid phase oxidation of a polyalkyl benzene in the presence of a catalyst comprising, in conjoint presence, bromine and a heavy metal oxidation catalyst, wherein air is passed into a reaction zone in a reaction vessel containing a liquid body of said polyalkyl benzene dissolved in from about 0.5 to about 5.0 parts by volume of acetic acid per part of polyalkyl benzene, the method of preventing formation of explosive effluent gas compositions when oxygen utilization is incomplete which comprises: continuously monitoring the oxygen content of the effluent gas, obtaining oxygen-lean effluent gas during a portion of a cycle when oxygen is being substantially completely consumed, and admitting said oxygen-lean effluent gas into the reaction zone in response to said monitored oxygen content in an amount effective to dilute the oxygen concentration in the effluent gas below about 8%, on a combustibles-free basis.

References Cited in the file of this patent
UNITED STATES PATENTS

| | | |
|---|---|---|
| 2,479,067 | Gresham | Aug. 16, 1949 |
| 2,552,278 | Hochwalt | May 8, 1951 |
| 2,761,872 | Hann | Sept. 4, 1956 |
| 2,788,367 | Bills et al. | Apr. 9, 1957 |
| 2,833,816 | Saffer et al. | May 6, 1958 |
| 2,890,245 | Bonnet | June 9, 1959 |